(12) United States Patent
Weiler

(10) Patent No.: US 7,487,630 B2
(45) Date of Patent: Feb. 10, 2009

(54) JET ENGINE WITH COMPACT ARRANGEMENT OF FAN

(75) Inventor: Wolfgang Weiler, Dachau (DE)

(73) Assignee: MTU Aero Engines GmbH, Munich (DE)

( * ) Notice: Subject to any disclaimer, the term of this patent is extended or adjusted under 35 U.S.C. 154(b) by 421 days.

(21) Appl. No.: 11/407,542

(22) Filed: Apr. 19, 2006

(65) Prior Publication Data

US 2006/0236675 A1   Oct. 26, 2006

(30) Foreign Application Priority Data

Apr. 20, 2005   (DE) ................. 10 2005 018 139

(51) Int. Cl.
*F02K 3/04* (2006.01)
*F02K 3/072* (2006.01)
*F02C 3/067* (2006.01)

(52) U.S. Cl. ........................ 60/226.1; 60/268

(58) Field of Classification Search ............. 60/226.1, 60/268, 39.162
See application file for complete search history.

(56) References Cited

U.S. PATENT DOCUMENTS

| | | | | |
|---|---|---|---|---|
| 3,363,831 A | * | 1/1968 | Garnier | 415/65 |
| 5,010,729 A | * | 4/1991 | Adamson et al. | 60/268 |
| 2005/0198941 A1 | * | 9/2005 | Bart et al. | 60/226.1 |

* cited by examiner

*Primary Examiner*—Ted Kim
(74) *Attorney, Agent, or Firm*—W. F. Fasse; W. G. Fasse

(57) ABSTRACT

A jet engine includes a fan arranged upstream of a core engine having a low pressure compressor, a high pressure compressor, a combustion chamber, a high pressure turbine, and a low pressure turbine. The high pressure turbine is drive-connected to the high pressure compressor. The low pressure turbine is drive-connected through a transmission to the low pressure compressor and to the fan, which are respectively driven in opposite rotation directions. A compressor disk of the low pressure compressor is positioned downstream directly after the fan so that a hub end section of the fan and the compressor disk together form a counter-rotating compressor stage.

17 Claims, 3 Drawing Sheets

JET ENGINE WITH COMPACT ARRANGEMENT OF FAN

PRIORITY CLAIM

This application is based on and claims the priority under 35 U.S.C. §119 of German Patent Application 10 2005 018 139.2, filed on Apr. 20, 2005, the entire disclosure of which is incorporated herein by reference.

FIELD OF THE INVENTION

The invention relates to a jet engine comprising a bypass fan as well as a core engine that includes a low pressure compressor, a high pressure compressor, a combustion chamber, a high pressure turbine, and a low pressure turbine.

BACKGROUND INFORMATION

The essential basic components of a typical jet engine are a core engine embodied as a gas turbine engine, and a fan module arranged upstream of the core engine. A total intake airflow that flows through the fan module is divided into a core engine airflow that is provided into the core engine, and a bypass airflow that bypasses or flows outwardly past the core engine. Such bypass jet engines are also designated as two circuit jet engines.

As generally schematically indicated in FIG. 4, the core engine includes at least one compressor, at least one combustion chamber, and at least one turbine. Typically, the core engine includes two compressors arranged flow-upstream from a combustion chamber, as well as two turbines positioned flow-downstream from the combustion chamber. More particularly, the two compressors include a low pressure compressor and a high pressure compressor, and the two turbines include a high pressure turbine and a low pressure turbine. The rotors of the high pressure compressor and the high pressure turbine are connected by a first shaft, while the rotors of the low pressure compressor and the low pressure turbine are connected by a second shaft. The two shafts are arranged concentrically or coaxially, i.e. with one shaft nested inside the other shaft. Other conventional engines are known, which additionally include an intermediate pressure compressor and an intermediate pressure turbine, of which the respective rotors are connected by a further shaft.

It is generally known in practice, in such conventional two circuit jet engines, that the fan is driven to rotate in a direction opposite or contrary to the rotation direction of the low pressure compressor. In that regard, the low pressure compressor is driven directly by the low pressure turbine via the second shaft, while the fan is driven by the low pressure turbine through an interposed transmission. Still further, a so-called bearing star or spider is arranged between the fan and the low pressure compressor in order to support and rotatably bear the fan. As a result, in the conventional arrangement, the fan is positioned at a considerable spacing distance flow-upstream from the low pressure compressor. The low pressure compressor itself typically comprises several compressor stages.

The above described general construction concept for a conventional two circuit jet engine is characterized by a relatively long structural configuration. This is at least partially due to the significant spacing distance between the fan and the low pressure compressor, whereby the low pressure compressor is further embodied with multiple stages. These features leading to a large structural length of the jet engine further bring about a high total weight of the engine and impair or reduce the operating efficiency thereof.

SUMMARY OF THE INVENTION

In view of the above, it is an object of the invention to provide a jet engine that has a more-compact arrangement of a fan. The invention further aims to avoid or overcome the disadvantages of the prior art, and to achieve additional advantages as apparent from the present specification. The attainment of these objects is, however, not a required limitation of the claimed invention. The above objects have been achieved according to the invention in a jet engine including a core engine and a fan arranged upstream from the core engine. The core engine comprises a low pressure compressor, a high pressure compressor, a combustion chamber, a high pressure turbine, and a low pressure turbine. Through a first drive line, the high pressure turbine is mechanically coupled to and drives the high pressure compressor. Through a second drive line, the low pressure turbine is mechanically coupled to and drives the low pressure compressor and the fan in respective opposite rotation directions. The fan and a compressor disk of the rotor of the low pressure compressor positioned downstream from the fan are arranged directly in succession one after another in the flow direction, in such a manner that a hub end section of the fan and the compressor disk of the low pressure compressor together form a counter-rotating compressor stage. Preferably according to particular example embodiments, the fan and the adjacent compressor disk of the low pressure compressor are arranged directly adjacent one another without any other element interposed therebetween, and are preferably spaced apart at a sufficiently small or close distance to form the counter-rotating compressor stage based on efficient flow considerations.

Further preferably according to particular example embodiments of the invention, the conventional arrangement of a bearing star or spider between the fan and the low pressure compressor is avoided, i.e. there is no such bearing element between the fan and the low pressure compressor. Thereby, the fan is arranged directly neighboring and upstream from the low pressure compressor, in such a manner so that the hub end section of the fan and a compressor disk of the rotor of the low pressure compressor arranged downstream from the fan together form a counter-rotating compressor stage. Thereby, a significant shortening of the overall structural length of the total jet engine is possible, whereby weight and costs can also be saved. This finally also results in an improved operating efficiency of the jet engine.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF EXAMPLE EMBODIMENTS AND THE BEST MODE OF THE INVENTION

Figure 3:
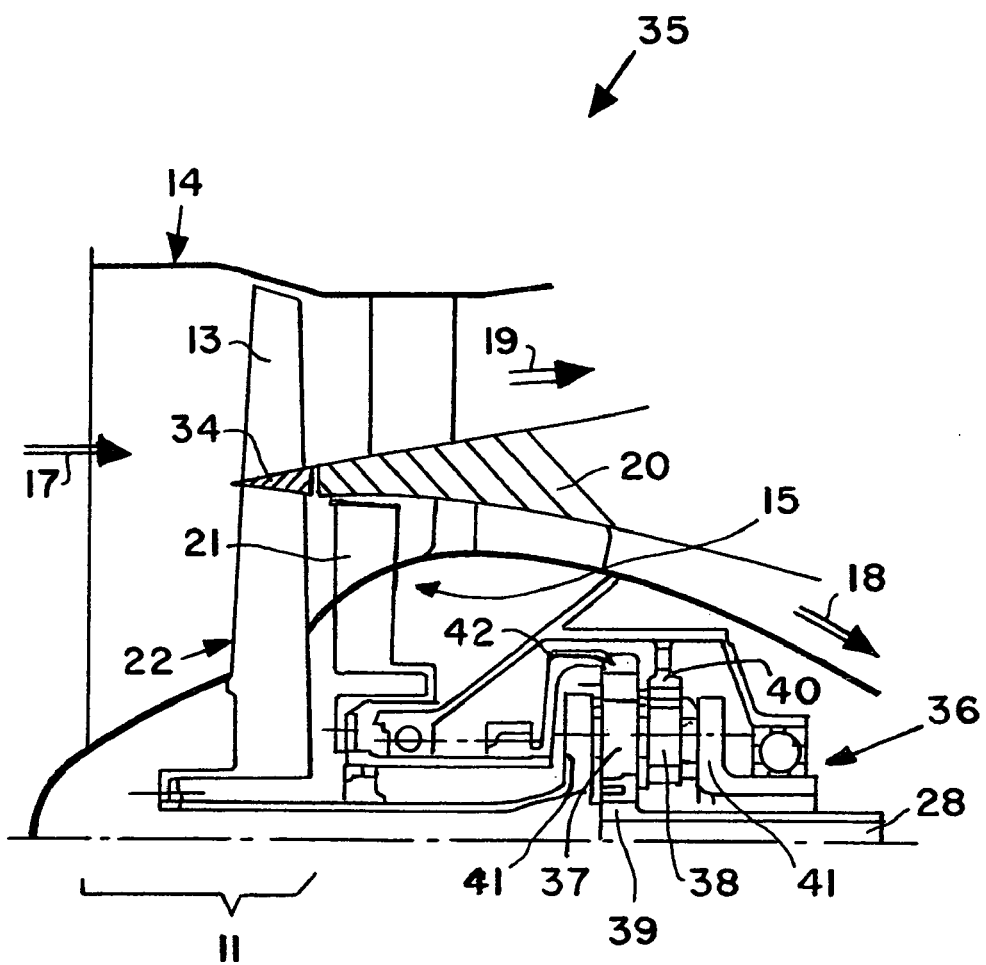
FIG. 3 is a schematic sectional view of a portion of a jet engine according to a second example embodiment of the invention, in the area of the fan and the low pressure compressor.
Figure 4:
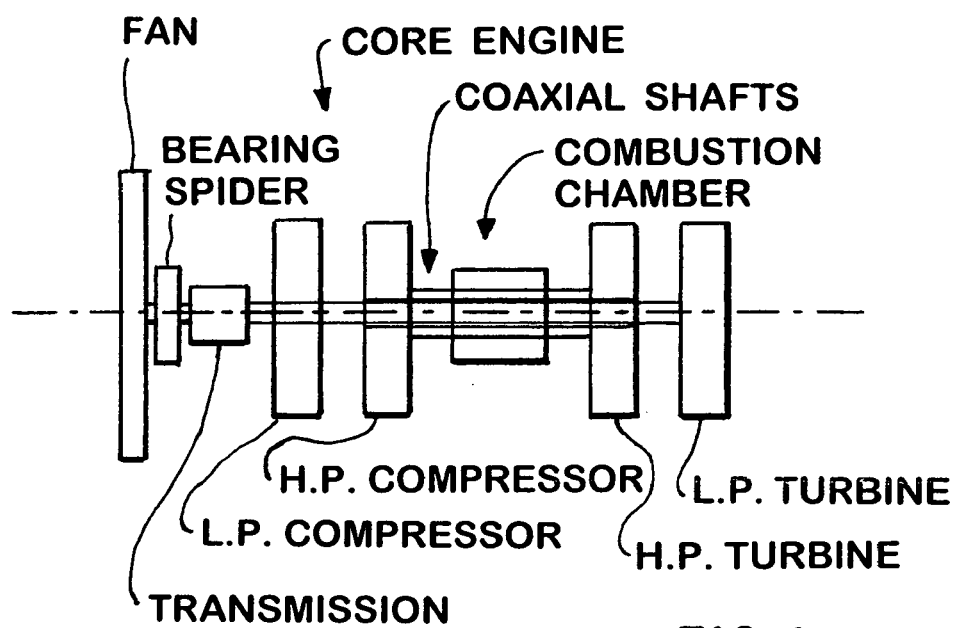
FIG. 4 is a schematic diagram of major components of a conventional jet engine, some of which are also common to example embodiments of the inventive jet engine.

The general arrangement of major components of a conventional jet engine as shown in FIG. 4 has been discussed above in the Background Information section. Jet engines according to example embodiments of the present invention include some components similar to the conventional engine, such as the two compressors, the combustion chamber, and the two turbines. The significant differentiated features of the inventive embodiments will now be discussed in further detail in connection with the partial views of FIGS. 1 to 3 focusing on the arrangement of the fan, the low pressure compressor, and the transmission.

Figure 1:
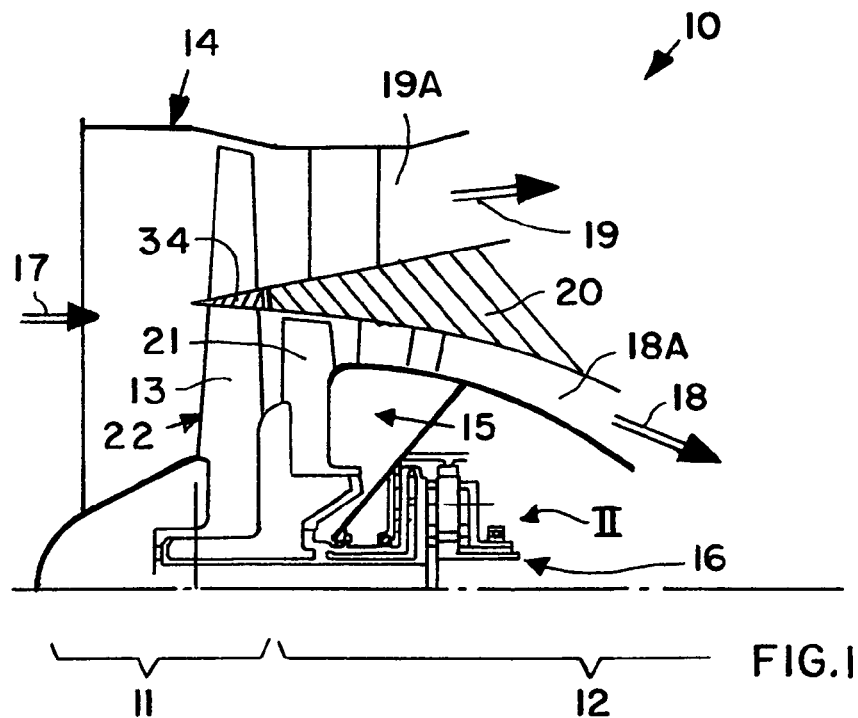
FIG. 1 is a schematic sectional view of a portion of a jet engine according to a first example embodiment of the invention, in an area of the fan and the low pressure compressor.

FIG. 1 shows a portion of a jet engine 10 embodied as a bypass or two circuit jet engine, which generally comprises a fan module 11 as well as a core engine 12. The fan module 11 comprises a fan 13 and a fan housing or casing 14. In the present example embodiment, the core engine 12 comprises a single-stage low pressure compressor 15 as well as further components arranged flow-downstream from the low pressure compressor 15. These further components are not shown in FIG. 1, but may include a high pressure compressor, a combustion chamber, a high pressure turbine, and a low pressure turbine, for example in the conventional manner discussed above. The high pressure turbine is mechanically coupled to and drives the high pressure compressor via a first drive line comprising a first shaft. The low pressure turbine is connected via a shaft 28 to a transmission 16, from which it is further connected through a shaft 15A to the low pressure compressor 15 and through a shaft 13A to the fan 13. Thereby, the low pressure turbine drives both the low pressure compressor 15 as well as the fan 13, through a second drive line including the shafts 28, 13A and 15A and the transmission 16.

As can further be seen in FIG. 1, a total intake airflow 17 flows into the fan module 11. A first portion of this intake airflow 17 forms a core airflow 18 that is provided into a core passage or channel 18A of the core engine 12, while the remaining second portion of the intake airflow 17 forms a bypass airflow 19 that is supplied into a bypass passage or channel 19A outside of the engine housing or casing section 20 so as to bypass the core engine 12. Thus, the core engine flow channel 18A is separated from the bypass flow channel 19A by the stator-side engine housing or casing section 20, and the bypass channel 19A is outwardly bounded by the fan housing 14.

As mentioned above, both the fan 13 as well as the low pressure compressor 15 are driven from the low pressure turbine through the interposed transmission 16. The transmission 16 is compactly arranged behind or in a downstream flow direction from the low pressure compressor 15. The transmission 16 is constructed so that the fan 13 rotates in an opposite or contrary direction relative to the low pressure compressor 15. The fan 13 and a rotor disk 21 of the low pressure compressor 15 located downstream from the fan 13 are positioned directly successively one behind the other. Namely, the compressor rotor disk 21 directly follows the fan 13 in the flow direction. Particularly, this directly adjacent or neighboring arrangement is such that a hub end section 22 of the fan 13 and the compressor rotor disk 21 together form a counter-rotating compressor stage.

The arrangement of this inventive embodiment expressly avoids and excludes the conventionally typical bearing star or spider arranged between the fan 13 and the low pressure compressor 15. Further preferably, the arrangement of a particular example embodiment avoids any and all mechanical components interposed between the fan 13 and the low pressure compressor 15. The arrangement is thus a flying or floating arrangement, or an overhung arrangement, of both the fan 13 as well as the low pressure compressor 15. Concretely, the inventive arrangement may use a coaxial bearing 43 between the output shaft 13A of the transmission 16 driving the fan 13 and the output shaft 15A of the transmission 16 driving the low pressure compressor 15, without necessitating any additional axial space between the fan 13 and the adjacent disk 21 of the compressor 15. The transmission 16 thus has the input shaft 28 from the low pressure turbine on one side, and the two output shafts 13A and 15A respectively driving the fan 13 and the low pressure compressor 15 on the other side, whereby the two shafts 13A and 15A are coaxially arranged with the bearing 43 therebetween.

Figure 2:
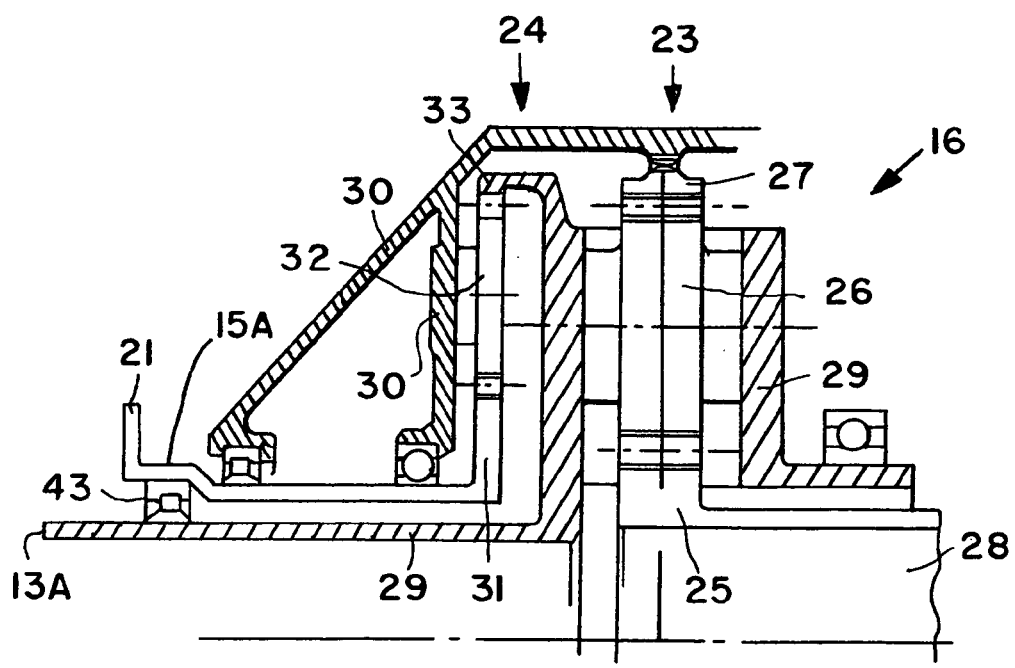
FIG. 2 is an enlarged sectional detail view of the detail portion II of the jet engine according to FIG. 1.

FIG. 2 is an enlarged detail sectional view of the transmission 16 of the jet engine 10 of the embodiment according to FIG. 1. This transmission 16 is particularly a planetary transmission, which includes two partial transmissions 23 and 24.

The partial transmission 23 includes a sun wheel or gear 25, a planet wheel or gear 26, as well as a hollow wheel or gear 27. The sun gear 25 of the partial transmission 23 is positioned on and rotates together with the input shaft 28 leading to the low pressure turbine. A so-called planet gear carrier 29 engages both sides of the planet gear 26, whereby this planet gear carrier 29 can also be considered as a strapping bracket or cross piece. The hollow gear 27 of the partial transmission 23 is connected with a transmission housing 30 so as to be fixed to the housing in the circumferential direction. The planet gear carrier 29 is coupled with the fan 13, in that a portion of the planet gear carrier 29 extends into or becomes or is connected to the fan shaft, 13A.

The second partial transmission 24 comprises a sun wheel or gear 31, a planet wheel or gear 32, and a hollow wheel or gear 33. The hollow gear 33 of the partial transmission 24 is connected with the planet gear carrier 29 of the planet gear 26. The planet gear 33 of the partial transmission 24 engages the transmission housing 30, i.e. particularly is supported so as to be fixed to the housing in the circumferential direction. The sun gear 31 leads to the rotor disk 21 of the low pressure compressor 15, i.e. the sun gear 31 extends into or is connected to the compressor shaft 15A driving the compressor 15.

The power input into the transmission 16 according to FIGS. 1 and 2 is thus from the input shaft 28 via the sun gear 25 of the partial transmission 23. On the other hand, a first output of the transmission 16 is provided via the planet gear carrier 29 of the planet gear 26 of the partial transmission 23 via the shaft 13A to the fan 13, whereby it is ensured that the fan 13 rotates in the same rotation direction as the low pressure turbine. A second output of the transmission 16 of FIGS. 1 and 2 is provided via the sun gear 31 of the partial transmission 24 with a housing-fixed carrier of the planet gear 32 of the partial transmission 24 via the compressor shaft 15A driving the rotor disk 21 of the low pressure compressor 15. Thereby, the rotor disk 21 of the compressor 15 is driven in the opposite rotation direction relative to that of the low pressure turbine and of the fan 13. Namely, as a result, the fan 13 and the compressor disk 21 are rotated in opposite directions relative to each other.

Through a proper dimensioning of the radii or diameters of the sun gears, planet gears, and thus also the hollow gears, the transmission ratios between the rotational speeds of the low pressure turbine and the fan 13 on the one hand and the low pressure turbine and the low pressure compressor 15 on the other hand, can be determined or ensured as necessary. Preferably in a particular example embodiment, the fan 13, the rotor disk 21 of the low pressure compressor 15, and the low pressure turbine respectively rotate with respective different rotational speeds.

As mentioned above, the core engine flow channel 18A is separated from the bypass flow channel 19A by the stator-side casing or housing section 20. Furthermore, as can be seen in FIG. 1, a flow guide element 34 is allocated to or provided on the fan 13, so as to divide the core engine flow channel 18A from the bypass flow channel 19A already in the area or axial region of the fan 13. In other words, the flow guide element 34 provided on the fan 13 aligns with and aerodynamically smoothly transitions to the upstream end of the housing section 20. Moreover, the flow guide element 34 radially outwardly bounds or directly adjoins the hub end section 22 of the fan 13, which forms the counter-rotating compressor stage together with the rotor disk 21 of the low pressure compressor 15 positioned directly flow-downstream from the fan 13. The flow guide element 34 thus assists in dividing and guiding the intake airflow 17 between the core airflow 18 to the core channel 18A and the bypass airflow 19 to the bypass channel 19A. The flow guide element 34 is also designated as a flow divider.

A further example embodiment of a jet engine 35 is shown in FIG. 3. This embodiment of a jet engine 35 differs from the jet engine 10 described above simply with regard to the construction and arrangement of the transmission 36 in comparison to the transmission 16. This transmission 36, like the transmission 16, drives the fan 13 on the one hand, and the low pressure compressor 15 on the other hand, from the drive input provided from the low pressure turbine. In order to avoid unnecessary repetitions in the present discussion, the same components and assemblies will be referenced with the same reference numbers as in the example embodiment according to FIGS. 1 and 2, and the following discussion will focus on the details by which the embodiment of FIG. 3 differs from the embodiment of FIGS. 1 and 2.

In this embodiment of FIG. 3, both the fan 13 as well as the compressor rotor disk 21 of the low pressure compressor 15 are once again driven from the low pressure turbine through the interposed transmission 36. This transmission 36 is constructed and embodied as a so-called differential planetary gearing or transmission. The differential planetary transmission 36, as shown in FIG. 3, includes two planet gears 37 and 38 with different diameters, which are coupled to one another in a rotationally fixed manner, i.e. so that they rotate in common with one another. A sun gear 39 of the differential planetary transmission 36 is coupled with the input shaft 28 and is engaged with the planet gear 37, which has a larger diameter than the planet gear 38 in the present example embodiment of FIG. 3. Furthermore, a hollow gear 40 fixed to the housing engages the planet gear 38. A so-called planet gear carrier 41, also known as a strapping or interconnecting bracket or cross piece, extends to both sides of the two planet gears 37 and 38, and is coupled with the fan 13 through the respective associated output shaft in the embodiment as shown in FIG. 3. A further hollow gear 42 of the differential planetary transmission 36 according to FIG. 3 engages the planet gear 37 with the larger diameter and is coupled with the compressor rotor disk 21 of the low pressure compressor 15 through the respective associated output shaft.

Thus, in the differential planetary transmission 37 according to FIG. 3, the power input occurs via the sun gear 39, which is coupled with the input shaft 28 leading to the low pressure turbine. A first power output is provided via the planet gear carrier 41 through the associated output shaft to the fan 13, whereby the fan 13 rotates in the same direction as the low pressure turbine. A second power output is provided via the hollow gear 42 through the associated output shaft to the compressor rotor disk 21 of the low pressure compressor 15, whereby a rotation direction reversal is established for the compressor 15. Namely, the low pressure compressor 15 rotates in the opposite rotation direction as compared to the fan 13 and the low pressure turbine.

The differential planetary transmission 37 according to FIG. 3 is able to realize greater transmission ratios than the planetary transmission 16 of the example embodiment according to FIGS. 1 and 2.

It is a common feature to both example embodiments (namely FIGS. 1 and 2 as well as FIG. 3), that the fan 13 and the oppositely rotating compressor rotor disk 21 of the low pressure compressor 15 positioned flow-downstream from the fan 13 are positioned directly or immediately successively one after another, and particularly in such a manner that the fan 13 and the compressor disk 21 together form a counter-rotating compressor stage. Namely, the hub end sections 22 of all of the blades of the fan 13 cooperate with the blades of the compressor disk 21 to compress the core airflow 18 flowing through the counter-rotating compressor stage formed by the fan 13 and the compressor disk 21.

Furthermore, in both example embodiments of the invention described above, the typical bearing star or spider that is conventionally arranged between the fan and the low pressure compressor of a jet engine is expressly omitted and excluded according to the invention. While that is not a mandatory feature of the broadest scope of the invention, it is preferred because thereby it is possible to shorten the total structural length of the jet engine. Cost reductions, weight savings, and an improvement of the overall operating efficiency of the jet engine are achieved.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A jet engine comprising:
    a fan;
    a low pressure compressor including a low pressure compressor rotor having at least a first compressor disk;
    a high pressure compressor;
    a combustion chamber;
    a high pressure turbine;
    a low pressure turbine;
    a first drive line connecting said high pressure turbine to said high pressure compressor;
    a second drive line connecting said low pressure turbine to said low pressure compressor and to said fan; and
    an engine housing defining therein a core engine flow passage passing through said fan, said low pressure compressor, said high pressure compressor, said combustion chamber, said high pressure turbine, and said low pressure turbine;
    wherein said first compressor disk is arranged downstream directly after said fan in a flow direction along said core engine flow passage so that a hub-end section of said fan and said first compressor disk together form a counter-rotating compressor stage.

2. The jet engine according to claim 1, wherein said low pressure compressor is a single-stage compressor, and said first compressor disk is a single only rotor disk comprised by said low pressure compressor rotor.

3. The jet engine according to claim 1, excluding a bearing spider between said fan and said first compressor disk.

4. The jet engine according to claim 1, excluding all mechanical components in a space in said core engine flow passage between said fan and said first compressor disk.

5. The jet engine according to claim 1, having a floating support arrangement of said fan and said low pressure compressor rotor relative to one another.

6. The jet engine according to claim 1, wherein said second drive line includes a first output shaft connected to said fan, and a second output shaft connected to said low pressure compressor rotor and arranged coaxially around said first output shaft, and further comprising a rotation bearing coaxially between said first and second output shafts.

7. The jet engine according to claim 1, wherein said second drive line includes a transmission that is so constructed and so couples said fan and said low pressure compressor such that said fan and said low pressure compressor have respective opposite rotation directions relative to one another.

8. The jet engine according to claim 7, wherein said transmission is so constructed such that said fan has a same rotation direction as said low pressure turbine, and said low pressure compressor has an opposite rotation direction as said low pressure turbine.

9. The jet engine according to claim 7, wherein said transmission is arranged on an opposite side of said low pressure compressor from said fan.

10. The jet engine according to claim 7, wherein said transmission is so constructed such that said fan and said low pressure compressor and said low pressure turbine respectively have different rotation speeds relative to one another.

11. The jet engine according to claim 7, wherein said transmission is a planetary gearing transmission.

12. The jet engine according to claim 7, wherein said transmission is a differential planetary gearing transmission.

13. The jet engine according to claim 1, further comprising a fan housing that surrounds said fan and said engine housing and that defines a bypass flow passage between said fan housing and said engine housing, and wherein said fan comprises a fan rotor disk with fan blades and a flow guide element that separates said bypass flow passage from said core engine flow passage.

14. The jet engine according to claim 13, wherein said flow guide element is a flow divider.

15. The jet engine according to claim 13, wherein said flow guide element is arranged on said fan blades at a location aligning with a forward end of said engine housing, and said flow guide element transitions aerodynamically smoothly into said forward end of said engine housing.

16. A jet engine comprising:
a fan;
a low pressure compressor including a low pressure compressor rotor having at least a first compressor disk;
a high pressure compressor;
a combustion chamber;
a high pressure turbine;
a low pressure turbine;
a first drive line connecting said high pressure turbine to said high pressure compressor;
a second drive line connecting said low pressure turbine to said low pressure compressor and to said fan;
an engine housing defining therein a core engine flow passage passing through said fan, said low pressure compressor, said high pressure compressor, said combustion chamber, said high pressure turbine, and said low pressure turbine; and
a fan housing that surrounds said fan and said engine housing and that defines a bypass flow passage between said fan housing and said engine housing;
wherein said first compressor disk is arranged downstream directly after said fan in a flow direction along said core engine flow passage so that a hub-end section of said fan and said first compressor disk together form a counter-rotating compressor stage; and
wherein said fan comprises a fan rotor disk with fan blades and a flow guide element that separates said bypass flow passage from said core engine flow passage.

17. A jet engine comprising:
a fan;
a low pressure compressor including a low pressure compressor rotor having at least a first compressor disk;
a high pressure compressor;
a combustion chamber;
a high pressure turbine;
a low pressure turbine;
a first drive line connecting said high pressure turbine to said high pressure compressor;
a second drive line connecting said low pressure turbine to said low pressure compressor and to said fan; and
an engine housing defining therein a core engine flow passage passing through said fan, said low pressure compressor, said high pressure compressor, said combustion chamber, said high pressure turbine, and said low pressure turbine;
wherein said first compressor disk is arranged downstream directly after said fan in a flow direction along said core engine flow passage so that a hub-end section of said fan and said first compressor disk together form a counter-rotating compressor stage; and
excluding all mechanical components in a space in said core engine flow passage between said fan and said first compressor disk.

* * * * *